United States Patent
Cappello et al.

(10) Patent No.: US 12,430,865 B2
(45) Date of Patent: Sep. 30, 2025

(54) SYSTEM AND METHOD FOR POSITIONING OBJECTS WITHIN AN ENVIRONMENT

(71) Applicant: Sony Interactive Entertainment Inc., Tokyo (JP)

(72) Inventors: Fabio Cappello, London (GB); Danjeli Schembri, London (GB); Mandana Jenabzadeh, London (GB); Oliver Hume, London (GB); Michael Lee Jones, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 133 days.

(21) Appl. No.: 18/053,037

(22) Filed: Nov. 7, 2022

(65) Prior Publication Data
US 2023/0146564 A1    May 11, 2023

(30) Foreign Application Priority Data
Nov. 10, 2021    (GB) ..................... 2116115

(51) Int. Cl.
*G06T 19/20* (2011.01)
*A63F 13/56* (2014.01)

(52) U.S. Cl.
CPC .............. *G06T 19/20* (2013.01); *A63F 13/56* (2014.09); *G06T 2219/2004* (2013.01)

(58) Field of Classification Search
None
See application file for complete search history.

(56) References Cited

U.S. PATENT DOCUMENTS

| | | | |
|---|---|---|---|
| 2012/0264520 A1* | 10/2012 | Marsland | A63F 13/533 463/43 |
| 2019/0349464 A1* | 11/2019 | Ma | G06F 3/017 |

(Continued)

FOREIGN PATENT DOCUMENTS

EP    3889914 A2    10/2021

OTHER PUBLICATIONS

Tutenel et al. (Generating Consistent Buildings: A Semantic Approach for Integrating Procedural Techniques, IEEE, 2011) (Year: 2011).*

(Continued)

*Primary Examiner* — Kyle Zhai
(74) *Attorney, Agent, or Firm* — Kilpatrick Townsend & Stockton LLP

(57) ABSTRACT

A system for positioning objects within an environment includes: an input unit operable to receive data representative of at least a portion of an environment comprising one or more features associated with the environment; an object determining unit operable to identify, for one or more objects, one or more features associated with each respective object, and operable to determine which of the one or more objects are to be positioned within the environment; and an object positioning unit operable to position the one or more determined objects within the environment in dependence upon at least one of the features associated with the environment and at least one of the features associated with each respective determined object, where the object positioning unit is operable to utilise a machine learning model, trained using one or more examples of one or more other objects positioned within at least a portion of one or more other environments in dependence upon at least one feature associated with each respective other environment and at least one feature associated with each respective other object as (Continued)

an input, to position the one or more determined objects within the environment.

18 Claims, 3 Drawing Sheets

(56) References Cited

U.S. PATENT DOCUMENTS

2020/0098180 A1* 3/2020 Khalid .................. G06T 19/003
2022/0383594 A1* 12/2022 Li .......................... G06V 10/25

OTHER PUBLICATIONS

Yang et al. (Automatic interior layout with user-specified furniture, vol. 94, Feb. 2021) (Year: 2021).*
Combined Search and Examination for corresponding GB Application No. 2116115.3, 5 pages, dated May 12, 2022.
J Devaranjan, et al., "Meta-Sim2: Unsupervised Learning of Scene Structure for Synthetic Data Generation," European Conference on Computer Vision, ECCV, pp. 715-733, vol. 12362, Nov. 19, 2020 (for Relevancy see Non-Lit. Pat. #1).

* cited by examiner

SYSTEM AND METHOD FOR POSITIONING OBJECTS WITHIN AN ENVIRONMENT

BACKGROUND OF THE INVENTION

Field of Invention

The present invention relates to a system and method for positioning objects within an environment.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Virtual environments are one type of environment where positioning objects at appropriate locations within an environment may be desirable. Not least due to the creation and use of virtual environments becoming increasingly popular in recent years, with the scope of the created virtual environments expanding considerably. Video games are one area where virtual environments are frequently used, with such virtual environments having become larger, more immersive, and/or more complex over time.

Virtual environments, including those used in video games, often require a large number of objects to be placed in appropriate positions within the virtual environment. These objects may include furniture, trees, buildings, or non-player characters. Some objects may also be interacted with by a user or an avatar within the virtual environment controlled by a user. However, placing objects appropriately within a virtual environment is a time consuming and expensive process; often requiring a team of experienced designers.

Additionally, users often desire to create their own customised content in a pre-existing virtual environment, such as customised challenges and levels, by re-positioning objects already present in the virtual environment, positioning additional objects within the virtual environment, or by removing some or all of the objects already present in the virtual environment and positioning one or more other objects within the virtual environment. However, in order to create content that is of a comparable quality to that generated by the developers of a game a significant burden is placed upon a user—designing such content may require a significant amount of skill and time, and this can limit the ability of a user to fully realise their content.

Some developers rely on procedural generation to position objects within a virtual environment. This can be advantageous in that a new layout for a virtual environment may be generated based upon a number of predefined rules or relationships between different objects—and thereby the number of possible layouts of a virtual environment can be increased without adding a significant overhead in terms of developer time. However, whilst a vast number procedurally generated layouts of virtual environments are possible, their generation is frequently too heavily constrained, resulting in a lack of variety, or too loosely constrained, resulting in a jarring or discontinuous placement of objects within a virtual environment as well as potentially not being suitable for the content that the layout of the virtual environment is generated for.

One particular problem associated with procedural generation is the condition that may be known as 'procedural oatmeal', in which a large number of layouts for a virtual environment can be generated, which are all different, but lack distinctiveness. The name of this is derived from an analogy in which procedural generation is used to generate bowls of oatmeal—while each may have a different arrangement of oats, the person eating the oatmeal will not be able to tell the difference. In the context of a virtual environment, this could lead to an example in which a user can be provided with a large number of different layouts for a virtual environment, but each layout produces the same overall impression during gameplay.

Therefore, while procedural generation has been identified as a solution to a number of problems associated with earlier arrangements for positioning objects within a virtual environment, there are still outstanding problems that make the adoption of procedural generation undesirable in many circumstances.

It is in this context that the present disclosure arises.

SUMMARY OF THE INVENTION

In a first aspect, a system for positioning objects within an environment is provided in claim 1.

In another aspect, a method for positioning objects within an environment is provided in claim 13.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Object Positioning

With the significant time and, thus frequently high cost, required to position objects within an environment, it is desirable to provide a system and method for positioning objects within an environment that may advantageously enable one or more objects to be positioned within the environment in dependence upon at least one of feature associated with the environment and at least one of feature associated with each respective object.

Figure 1:
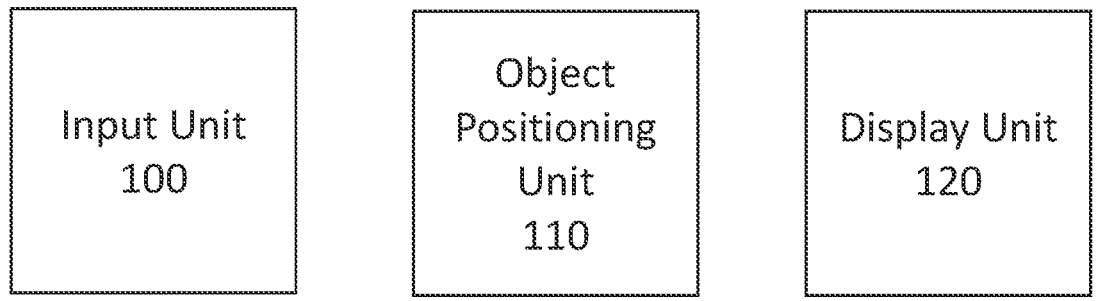
FIG. 1 schematically illustrates an example object positioning system.

Referring now to the drawings, wherein like reference numerals designate identical or corresponding parts throughout the several views, FIG. 1 schematically illustrates a system for positioning objects within, and using, an environment in accordance with one or more embodiments of the present disclosure. This system comprises an input unit 100, an object positioning unit 110, and a display unit 120. The system of FIG. 1 is configured to receive inputs and use these to position objects within, and output, environments and/or virtual environments.

The input unit 100 is configured to receive one or more inputs from a user (such as the player of a game, or a developer of content comprising one or more environments). These inputs can comprise one or more control devices (such as a gamepad or keyboard and mouse), and these inputs can be provided to a different device to the device that performs the object positioning process. Alternatively, or in addition, inputs may be generated without a user input in dependence upon one or more predetermined conditions that can be used to specify the values of inputs. The inputs are used to constrain the object positioning process; examples of inputs are discussed below, but can include data representative of at least a portion of an environment and/or virtual environment for objects to be positioned within, specifying one or more objects to include in an environment and/or virtual environment, or one or more features associated with the environment.

The object positioning unit 110 is configured to position one or more objects within at least a portion of an environment in dependence upon at least the inputs provided to the input unit 100 including data representative of at least the portion of an environment. The data representative of an environment can take any suitable format; one example is that of a map that comprises sufficient detail so as to enable object positions to be determined for an environment corresponding to the map in dependence upon map features. In some embodiments, at least a portion of the environment itself may be provided to the object positioning unit 110.

The display unit 120 is operable to display one or more of the environments comprising one or more objects positioned by the object positioning unit 110. This display may include one or more rendering processes to generate images for display, or it may simply display images that are output by a device associated with the object positioning unit 110 or an intermediate device that executes a game (or other application) in dependence upon the output from the object positioning unit 110.

The system of FIG. 1 may be implemented using any suitable combination of processing devices and/or other components. For instance, the input unit 100 may be associated with a first processing device (such as a personal computer used by a developer) while the object positioning unit 110 is implemented by a games console that is used to generate images of gameplay (comprising at least one environment comprising one or more objects positioned by the object positioning unit 110) for a player. In such an example, the display unit 120 may be used to generate and/or display the images of the gameplay—this may be a television or the like.

In some embodiments, one or more of the processing functions described above may be implemented using one or more server-based processing systems. This may be particularly advantageous in cloud gaming arrangements, for instance. In such cases, a server may be configured to receive inputs from a user to control the object positioning (which is performed by the server) with the environment being rendered as part of the gameplay that can then be streamed by the user at their client device. Alternatively, each of the processing functions may be implemented by a single device and an associated display (such as a games console and television) or a single device comprising each of the elements (such as a handheld games console).

In some embodiments, the images to be displayed to a user via the display unit 120 may be generated by an intermediate device that does not perform the object positioning—for instance, the object positioning unit 110 may be located at a server and the user may download an environment (or a representation of an environment) comprising one or more objects positioned by the object positioning unit 110 to a games console that is then operable to render the environment as a part of a game.

Figure 2:
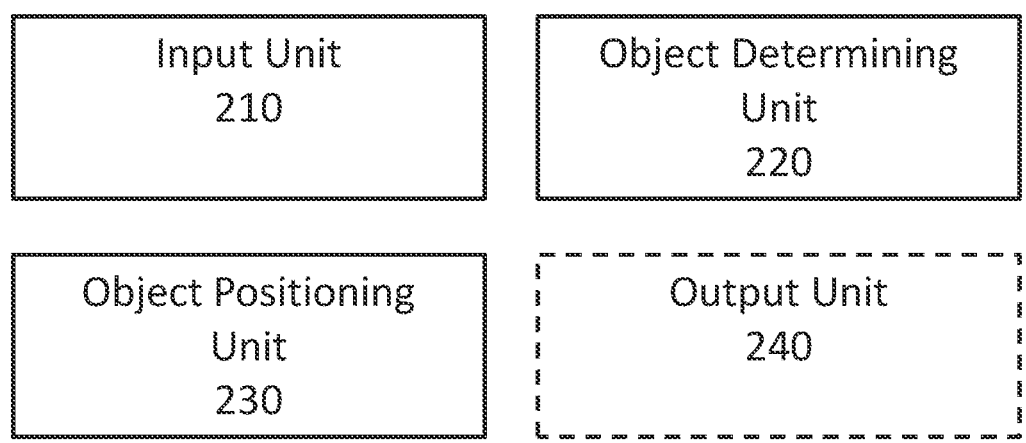
FIG. 2 schematically illustrates another example object positioning system.

Accordingly, turning now to FIG. 2, a system 200 for positioning objects within an environment is provided; this system 200 may correspond to the object positing unit 110 of FIG. 1, for example, although in some embodiments the processing performed by the system 200 may be distributed between different processing devices. The system 200 comprises an input unit 210, an object determining unit 220, and an object positioning unit 230.

The input unit 210 is operable to operable to receive data representative of at least a portion of an environment comprising one or more features associated with the environment. These features may be determined based upon user inputs, for example, or upon one or more conditions or criteria that can be used to infer features that are to be associated with the environment.

The object determining unit 220 is operable to identify, for one or more objects, one or more features associated with each respective object, and operable to determine which of the one or more objects are to be positioned within the environment.

The object positioning unit 230 is operable to position the one or more determined objects within the environment in dependence upon at least one of the features associated with the environment and at least one of the features associated with each respective object.

The object positioning unit 230 is operable to utilise a trained machine learning model, trained using one or more examples of one or more other objects positioned within at least a portion of one or more other environments in dependence upon at least one feature associated with each respective other environment and at least one feature associated with each respective other object as an input, to position the one or more objects within the environment.

In some instances, the system 200 may execute a rendering process associated with a video game by, for example, rendering the environment and the objects positioned within the environment. The optional output unit 240 may output the rendered environment. Alternatively, the system 200 may generate a virtual environment comprising the objects positioned within the environment, which may be outputted by the optional output unit 240 in a format that enables its use in another application.

The arrangement of FIG. 2 is an example of a processor (for example, a GPU and/or CPU located in a games console or any other computing device) that is operable to position objects within an environment, and in particular is operable to:

receive data representative of at least a portion of an environment comprising one or more features associated with the environment;

identify, for one or more objects, one or more features associated with each respective object, and determine which of the one or more objects are to be positioned within the environment; and position the one or more determined objects within the environment in dependence upon at least one of the features associated with the environment and at least one of the features associated with each respective object, wherein a machine learning model, trained using one or more examples of one or more objects positioned within at least a portion of one or more environments in dependence upon at least one feature associated with each respective environment and at least one feature associated with each respective object as an input, is utilised to position the one or more determined objects within the environment.

Optionally, as indicated by the dashed outline in FIG. 2, the system 200 may comprise an output unit 240 that is unit operable to output data representative of at least part of the environment comprising the one or more objects positioned by the object positioning unit 230. For example, the output unit 240 may output to a non-transitory storage medium, a display device, a client device, a transmission device, or any other suitable output device.

The features associated with the environment may be, for example, one or more significant features, which in some embodiments may be specified by a user as features that are significant within environment. A significant feature may be any feature that can be regarded as being distinctive within the environment; in other words, a significant feature may be a feature that differentiates a particular environment from other environments according to a suitable measure.

For instance, the distinctiveness or significance of a feature can be determined in dependence upon a visual impression upon a user, interactivity for a user, impact upon the environment, the uniqueness of the feature within a particular context (such as the rarity of a feature within a game), and/or one or more physical characteristics of the feature (such as whether the feature has a size that greatly exceeds that of other features within the environment), or a different listed type.

Examples of features associated with an environment may include: one or more locations for one or more "boss" type enemies, as these are often a defining feature of an environment (such as a particular level in a game); specific terrain features such as a mountain, cave or canyon which can be used to differentiate between different environments; a specific type of terrain, referred to as a "biome", such as an ocean, a desert or a jungle that is used to characterise the entire environment (and therefore is significant in terms of its impact upon the environment); a set of buildings or virtual areas which can be significant sources of interaction for a player in a game; a set of one or more tasks that a user may complete within the environment; or any other suitable feature.

The features associated with an object, identified by the object determining unit 220, may be, for example, one or more significant features, which in some embodiments may be specified by a user as features that are significant to the object. A significant feature may be any feature that can be regarded as being distinctive to the object; in other words, a significant feature may be a feature that differentiates a particular object from other objects according to a suitable measure.

For instance, the distinctiveness or significance of a feature can be identified, by the object determining unit 220, in dependence upon a visual impression upon a user, interactivity for a user, the uniqueness of the feature within a particular context (such as the rarity of an object within a game), and/or one or more physical characteristics of the object (such as whether the object has a size that greatly exceeds that of other objects), or a different listed type.

In some embodiments, the object determining unit may identify one or more features associated with an object from a list comprising one or more objects, which may be positioned in an environment, and the list comprising one or more features associated with each respective object within the list.

Examples of features associated with an object include: one or more labels associated with the object that may be used to characterise the entire object (such as "NPC", "furniture", "outdoors", "interactive", "collectable", or "unique"); specific aesthetic features such as colour, size, and shape, which can be used to differentiate between different objects; or any other suitable feature.

In some embodiments, the object determining unit 220 may be operable to determine which of the one or more objects are to be positioned by receiving one or more user inputs identifying at least one of the one or more objects to be positioned.

In some embodiments, the one or more user inputs may directly identify the one or more objects to be positioned. For example, a user may select the one or more objects to be positioned from a list of objects comprising at least the one or more objects to be positioned. It will be appreciated that herein a 'user' may for example be an application developer or a user of an application that facilitates application editing or so-called 'modding'.

Alternatively, or in addition, the one or more user inputs may identify a plurality of objects. The object determining unit 220 may select one or more objects from the plurality of objects identified by the user input. For example, a user may select a plurality of objects that share an aesthetic theme. However, there may be too many objects in the plurality of objects to be able to position all of the objects appropriately within an environment. Therefore, the object determining unit 220 may select one or more objects, which are to be positioned within the environment, from the plurality of objects identified by the user input. Conversely, if the user selects only one object, or fewer than a threshold number, then the object determining unit 220 may automatically select the object(s) to be positioned within the environment. In this way a user can optionally force the positioning of objects by the system.

Alternatively, or in addition, a user may identify one or more features, which may be associated with one or more objects. These one or more identified features may be provided as an input to the object determining unit 220. The object determining unit 220 may select one or more objects to be positioned within the environment in dependence upon at least one of the identified features.

In some embodiments, the above two types of user input may be combined. For example, one or more user inputs may identify one or more objects to be positioned, and one or more features that may be associated with one or more objects. The object determining unit 220 may select one or more other objects to be positioned within the environment in dependence upon one or more features of at least one identified object and at least one of the identified features.

For example, one or more user inputs may identify a wooden dining table as an object to be positioned within the environment, and may identify "chair" as a feature that may be associated with one or more objects. In this example, "chair" refers to a category that comprises one or more different types of chair, where each respective chair would be associated with the category "chair".

Example features associated with the dining table, which may be identified by the object determining unit 220, may include: a category of objects that comprises the dining table—"table"; the material—"wood"; the shape—"square"; the size— "2×2 dining chairs widths" (the size may be specified in any type of unit of measurement; "dining chair widths" has been used for simplicity in this example), and the type of environment suitable for the object—"dining room".

In dependence upon the one or more features associated with the dining table and the identified feature ("chair"), the object determining unit 220, may select four wooden dining chairs as additional objects to be positioned within the environment. For example, the object determining unit 220 may identify the number of chairs to select based upon the size and shape of the dining table (such as four dining chairs being an appropriate number for a "square" dining table with a size of "2×2 dining chairs widths"), the material of the chairs based on the material of the table ("wood"), and the style of chair based on the style of the table or what type of environment the table is suitable for ("dining room").

Optionally, in some embodiments, the object determining unit 220 may be operable to determine the one or more objects to be positioned by selecting the one or more objects to be positioned in dependence upon at least one of the features associated with the environment.

For example, consider an example portion of an environment comprising a dragon's lair, features associated with the portion of the environment may include: "boss room" to represent that a "boss" type enemy should be present in this environment, which may be further specified by an associated feature such as "boss type—dragon"; "wealthy" as a dragon's hoard may often contain a hoard of treasure; and "low population" as dragons are typically unsocial creatures.

The object determining unit 220 may select a "large dragon" as an object to be positioned within the environment in dependence upon the features "boss room" and "boss type—dragon", associated with the environment. The object determining unit 220 may select a "large hoard of treasure" as another object to be positioned within the environment in dependence upon the feature "wealthy", associated with the environment; alternatively, the object determining unit 220 may select many different objects with the associated feature "treasure" to be positioned within the environment instead of a single "large hoard of treasure" object. The object determining unit 220 may, in dependence upon the feature "boss room", associated with the environment, select an object with the associated feature "unique" as another object to be position within the environment. The object with the associated feature "unique" may a special item that grants the user a special ability for example, and is to be positioned within the environment as a reward for defeating the dragon.

Alternatively, or in addition, whether one or more features are associated with an environment and/or an object may be based on one or more criteria provided to the input unit. These criteria can be used to constrain the features associated with an environment and/or an object for a given application; for instance, by increasing immersion (where the criteria relate to the environment, for instance) or by improving the relevance of the final content (where the criteria relate to a task to be completed within the environment, for instance). For example, the criteria may be an amount of time that the environment is to be used for, which may limit the number or complexity of objects to be positioned within the environment, or a set of tasks that a user may complete in an environment. The tasks may require specific objects to be positioned within the environment by the object positioning unit 230.

For example, consider a set of tasks that comprises the following individual tasks: "gather cacti"; "talk to a monarch"; "sail a ship"; and "defeat a dragon". These tasks may be associated with an environment and require the environment to contain at least the following objects to enable completion of the tasks: cacti to be gathered; a monarch to talk to; a ship to sail; and a dragon to be defeated. Therefore it is apparent that the provision of a set of one or more tasks for a user to complete within an environment (such as quests or mini-games) can be used to identify objects to be positioned within the environment.

Therefore, in some embodiments, features associated with an environment may comprise a set of one or more tasks for a user to complete within the environment. In addition, features associated an object may comprise another set of one or more tasks that require the object for completion of at least a part of each respective task within the other set of one or more tasks. The object determining unit 220 may be operable to determine the one or more objects to be positioned by selecting the one or more objects to be positioned in dependence upon the set of one or more tasks for the user to complete within the environment and another set of one or more tasks associated with each respective object.

Returning now to the object positioning unit 230, the object positioning unit 230 is operable to position the one or more determined objects within the environment in dependence upon at least one of the features associated with the environment and at least one of the features associated with each respective determined object. For example, each respective determined object may have a relationship with one or more features associated with at least a part of the environment.

Optionally, the object positioning unit 230 may be operable to position at least one of the determined objects within the environment in dependence upon one or more features associated with one or more previously positioned objects. For example, there may be a relationship between the at least one of the determined objects and at least one of the features associated with at least one of the already positioned objects.

There are multiple options for how the above relationships may be determined. For example, one or more relationships may be predefined by a game developer. Alternatively, or in addition, one or more of the relationships may be identified by the machine learning model utilised by the object positioning unit 230 when the machine learning model is trained.

For example, cacti may be associated with a desert environment as this is where they are often found—and it can in some cases be beneficial for a user's sense of immersion if there is a realistic link between flora/fauna and a selected biome. Similarly, a monarch may be associated with a palace, castle, or marching army—thereby representing both structures and non-player characters (NPCs) as features of an environment that can have a relationship with an object. A ship may be associated with a body of water such as a lake, reservoir, or ocean, for instance. A dragon may be associated with a mountain, a dragon's lair, or a cave as a common habitat, indicating that terrain features of an environment can introduce constraints upon the positioning of a particular enemy within an environment.

Therefore, in some embodiments, the object positioning unit 230 may position at least one of the determined objects within the environment in dependence upon a relationship between the at least one of the determined objects and at least one of the features associated with at least one of already positioned objects.

In some embodiments of the present disclosure, the data representative of at least a portion of the environment comprises data representative of one or more objects already positioned within the environment. The data representative of one or more objects already positioned within the environment may be used in accordance with the techniques of the object determining unit 220 and/or object positioning unit 230 referring to already positioned objects, as described elsewhere herein. Alternatively, or in addition, the already positioned objects may be objects that the object positioning unit 230 has already positioned within the environment.

In some embodiments of the present disclosure, the object positioning unit 230 may be operable to identify, for the one or more determined objects, an order in which the one or more determined objects are to be positioned within the environment in dependence upon the one or more features associated with at least one of the determined objects.

For example, consider an example where the object positioning unit 230 is to position the following determined objects within an environment: a dining table; four dining chairs; a tablecloth; and a candelabra. In this example, a feature (which may be identified by the machine learning model or specified by a user for example) associated with a dining chair may be that the position of the dining chair is often dependent upon the position of a dining table. Therefore, the object positioning unit 230 may identify, based this feature, that the dining table should be positioned before the dining chairs are positioned.

Similarly, a feature associated with the table cloth may be that the position of the table cloth is often dependent upon the position of a dining table but independent of the position of dining chairs. Therefore, the object positioning unit 230 may identify, based this feature, that the table cloth should be positioned after the dining table, but may be positioned after, before or at the same time the dining chairs are positioned.

Meanwhile, a feature associated with the candelabra may be that the position of a candelabra is often dependent upon both the position of a dining table and the position of a tablecloth, but still independent of the position of the dining chairs. Therefore, the object positioning unit 230 may identify, based this feature, that the candelabra should be positioned after the dining table and tablecloth, but may be positioned after, before or at the same time the dining chairs are positioned.

In some implementations, the object positioning unit 230 may not identify an order for all of the determined objects, but only identify an order for some of the determined objects, such as when the positioning of one type of object is frequently dependent upon the positioning of another type of object.

Referring again to the above example, the object positioning unit 230 may identify that the candelabra should be positioned after the tablecloth, without specifying any other object dependencies for the candelabra, as the candelabras dependency upon the positioning of the dining table may already be reflected by the candelabras dependency upon the tablecloths positioning, which, in turn, has a dependency upon the positioning of the dining table.

In some embodiments of the present disclosure, a generative adversarial network (GAN) may be utilised in which a generative network is trained to position one or more determined objects within an environment (in dependence upon at least one of feature associated with the environment and at least one feature associated with each respective determined object).

The generative network may be trained so the positions of the one or more determined objects produce a desired result when they are evaluated by a discriminative network that is trained to evaluate a suitability of the positioning of one or more objects within an environment.

The discriminative network may be trained using a database of environments comprising one or more positioned objects. In some cases, in addition, or as an alternative, to the database comprising different environments, the database may contain a plurality of versions of an environment, where each version comprises one or more positioned objects different to, or in different positions within the environment in comparison to, the other versions of the environment. Therefore, it is noted that the database may comprise different environments, different versions of an environment, or any combination of the two.

Each environment may comprise one or more positioned objects where the positioning of each object within the environment, or the overall positioning of all of the positioned objects within at least part of the environment or the entire environment, may, for example, be classified as "suitable" or "not-suitable". Other classifications for each of the environments in the database may also, or alternatively, be used such as a suitability score, where the positioning of objects within an environment is classified by a numerical value that represents the suitability of the positions of objects within the environment for example.

A suitability score (or rating) may be defined in a number of ways, as appropriate for a particular implementation. In other words, the suitability of the positions of objects within an environment may vary in dependence upon a particular application for the environment—this can be the genre of a game for which the environment comprising the positioned objects is to be used for, or the scenario in which the environment is to be used for within a game (such as a boss fight or an open-world exploration segment of a game).

The suitability itself can be determined in dependence upon a number of aspects of the positioning of the one or more objects within an environment that relate to characteristics that are or are not desirable for a particular implementation.

For instance, if one or more trees are to be positioned within a portion of an environment that comprises a road, a suitability score may comprise an assessment of whether any trees have been positioned on the road. As trees are generally not found on roads, the suitability score may be lowered if one or more of the trees are positioned on the road. However, if the portion of the environment that comprises the road is associated with a feature that indicates that the portion of the environment, or the road, is abandoned or disused, the suitability score may, instead, be raised if one or more of the trees are positioned on the road, as trees may be found on a disused or abandoned road.

Furthermore, the classification of the suitability of the positioning of objects within each environment in the database may be variable in dependence upon the intended use of the environment comprising one or more positioned objects that the GAN is to be trained for.

For example, the positioning of some objects may be classified as "suitable" when a GAN is trained to position objects within an environment intended for a platforming video game, whilst being classified as "unsuitable" when a GAN is trained to position objects within an environment intended for an open world role playing game (RPG). This is because each of these genres have different requirements for the positioning objects within an environment due to differing types of gameplay; a platforming video game may require objects to be positioned far enough apart from each other to provide a sufficient challenge to a user jumping from one object to another, but not so far apart that a user would be unable to progress through the environment for example.

Of course, the suitability score could be derived based upon consideration of a number of different parameters rather than only a single parameter. In the example of using a GAN, the discriminator may be trained without any explicit knowledge of which features are considered to be indicative of particular suitability for a given application—in such a case, an existing dataset may be provided that indicates what object positioning within an environment would be suitable and what positioning would be unsuitable. From this, the discriminator could be trained to derive which parameters are indicative of suitability and therefore determine the suitability of the positioning of objects within an environment by the generator.

Alternatively, or in addition, a reinforcement learning model may be used in which a reward is determined based upon one or more characteristics of the positioning of objects within an environment. These characteristics can be selected in any suitable way; for instance, to represent realism (such as a measure of whether the positioning of objects within an environment could be representative of the positioning of objects within a real-world location), non-uniformity (ensuring that the positioning of objects isn't too homogeneous), playability (a measure of how well the user can interact with, and complete quests in, an environment comprising one or more positioned objects), and/or navigability (for instance, whether there are any objects positioned in locations that may prevent a user from accessing parts of the environment, which may or may not be desirable depending upon the particular use for the environment).

For example, in a training phase of the reinforcement learning model, a reward function may provide rewards when the positions of one or more objects within an environment have similar characteristics compared to the positions of one or more objects within one or more environments, where the one or more environments are preselected to be used for comparison prior to training the reinforcement learning model. These may be other objects and other environments in the sense of being different to those used when positioning objects in an environment with the trained system, or may be other objects and other environments in the sense of being other instances of similar or identical objects, or a combination of the two meanings.

For example, one of the characteristics to be compared may be the density of objects positioned within at least a portion of an environment, which may be an average density of a single type of object, such as trees, across the entire environment. Optionally, a higher resolution approach to the density of objects positioned within an environment may be used, such as comparing a heat-map of the density of objects positioned within an environment, which may be further refined by generating a different heat map for each different type of object positioned within the environment for example.

In some embodiments of the present disclosure, the machine learning model may be trained using the positions of one or more real and/or virtual objects within one or more real and/or virtual environments as inputs.

For example, the machine learning model may be trained using data representative of a real environment such as current or historical maps of real world cities and towns, a virtual model of a real building or environment, or any other suitable data that is representative of a real environment.

Alternatively, or in addition, the machine learning model may be trained using data representative of a virtual environment such as maps used in video games, maps used in fantasy books, a virtual environment used in a video game, or any other suitable data that is representative of a real environment.

In some embodiments, a model may be trained specifically using data representative of objects positioned within environments that have fantasy-themed setting, such as fantasy world and city maps (for example), as this may lead to improved positioning of objects for corresponding applications (that is, the positioning of objects within other fantasy-themed environments). In other words, the source of data representative of environments, or objects positioned within those environments, used for training a model may be selected in accordance with the type of environment that objects are intended to be positioned in.

The training of models may be performed with any desired level of granularity in respect of the intended usage. For example, in some cases a model may be trained that is intended to be used for a specific game, while in other cases the model may be trained so as to instead be used position objects within environments for a series of games or an entire genre. Similarly, a model could be trained for a more specific purpose, so as to only position objects within one type of environment such as indoor environments or a particular biome within an environment, or even trained to position objects within one specific environment.

In the case that a model is intended to be used for more than a single game, it is considered that it may be challenging to identify objects to be positioned within an environment. This is because each game may have its own set of objects, which may comprise different elements and the like. In such cases, the object positioning unit 230 may instead identify a position for a type of object rather than identifying a position for a specific object. For instance, rather than specifying the position of a particular tree model, the object positioning unit may specify that a tree is to be positioned at a particular location within the environment. Upon rendering, the game engine can then identify a particular tree model in accordance with this.

Optionally, each of the one or more environments that may be used as inputs to the machine learning model may be associated with one or more tags. These tags can be used to characterise the input data set so as to increase the efficiency and/or effectiveness of the training process. These tags can be used to describe features of the environments such as a categorisation of the environment itself (such as indoor/outdoor), the source of the environment, one or more significant features of the environment (such as 'contains rivers'), and/or one or more uses of the environment (such as 'boss level in an action game'). These tags can in some cases be used to identify one or more characteristics that may not be derivable from the environment itself, or would not necessarily be easy to derive. For example, the one or more tags may describe the area type of an environment such as "interior", "urban", "rural", "mountainous", or any other suitable environment area type or biome.

Alternatively, or in addition, one or more tags may describe specific objects that are already positioned within an environment such as "tree", "building", "road", "river", and "castle". The one or more tags that describe objects that are already positioned within an environment may also include position information, which describes where the one or more objects that correspond to each tag are positioned within the environment.

Other tags may describe the source of the environment such as "real world", "fantasy", "video games", "films", or any other suitable source of an environment. Some tags may describe additional information that may be associated with an environment such as a terrain elevation map or a resource deposit map. The above examples of one or more tags that may be associated with each of the one or more environments that may be used as inputs are not exhaustive and any other suitable tags may be used to categorise the environments.

As noted elsewhere herein, the environment(s) and objects used during training may come from a different application to the current one; for example, some generic environments and objects may be provided for training to enable 'out of the box' functionality. For a developer, environments and objects may be accessible from a library associated with a graphics engine, and may be supplied with that engine and/or may come from previous projects used by the developer, including for example earlier games/applications in a series. Using earlier games in a series enables the system to learn the specific look and feel of the series. The system can also learn from environments created for the current game application, whether designed by hand or already generated using the system (e.g. after developer approval/adjustment), so that the training may be iterative as the game/application grows. This may be helpful when developing a new game/application with distinctive environments/objects, or to speed up development once representative environments are established. A system trained on the current game/application may also be of help when developing expansions and modifications, and so a system trained in this way may be provided as part of a so-called 'modding tool' for end users.

While the above discussion has focused upon the use of a single trained model for positioning objects within an environment, in some embodiments it may be considered advantageous to use a plurality of trained models for positioning objects within an environment. For instance, a first model may be used to position objects that make up large-scale features of an environment (such as the trees within woodland, and the buildings within a city), while a second model may be used to position objects within the objects positioned by the first model.

For example, the second model could be trained to specifically position furniture within buildings positioned by the first model, and this can therefore be used to add detail to the objects positioned by the first model which positions only the buildings within a city. This can be advantageous in that the use of two separate models can enable a more specific training for providing specific features, which can improve the final environment. Of course, more than two models could be used in a particular implementation—for instance, a third model could be used to position NPCs within the buildings.

In some embodiments of the present disclosure, the machine learning model may be trained using one or more environments (rather than data representative of one or more environments such as a map) as an input. For example, the machine learning model may be trained using the positions within the one or more environment of one or more of: objects; regions; areas; biomes; paths; or any other suitable features within a respective environment. The one or more environments may be virtual environments used in video games for example. This may be distinct from the use of data representative of an environment as an input as it can enable the identification of particular features directly, and in some cases on a smaller scale (for instance, a virtual environment would contain individual trees while a corresponding data representative of the virtual environment, such as a map or image of the environment, may only identify that a forest exists).

Whilst specific examples for the type of machine learning model utilised by the object positioning unit 230 have been given above, the machine learning model is not limited to these examples and any other appropriate type of machine learning model may be used.

In some embodiments of the present disclosure, the environment may be a virtual environment for use in a video game. In these embodiments, the object positioning unit 230 may position one or more objects within at least a portion of the environment in response to an initialisation of the video game or a user input to the video game.

This may advantageously enable a reduction in the file size of a video game using a system 200 for positioning objects within an environment in accordance with the present disclosure compared to a video game model not using the system 200 for positioning objects within an environment. This is because it would only be necessary to provide the environment, rather than the environment comprising one or more positioned objects, which may have a smaller file size. This may therefore reduce the required amount of data that needs to be downloaded from a server or provided on a disc, for example.

For example, a client device (such as a games console) comprising the system 200 (that is, a processor for implementing the functionality of the object positioning unit 110 of FIG. 1) may download a video game (comprising a trained model for positioning objects within an environment) without requiring data defining the positions of one or more objects within the environment, as the objects positioning unit 230 may position one or more objects within at least a portion of the environment in response to an initialisation of the video game or a user input to the video game. The output unit 240 may then output and render a virtual environment corresponding to the environment comprising the objects positioned by the object positioning unit 230.

However, in some cases, a remote server may comprise the object positioning unit 220, which may position one or more objects within at least a portion of an environment. The server may then transmit at least the portion of the environment comprising the one or more objects positioned within the environment to a client device, such as a games console. The client device in such an example would comprise the output unit 240. Upon receipt of at least the portion of the environment from the server, the output unit may render a virtual environment corresponding to at least the portion of the environment received from the remote server. This is therefore an example of an implementation in which the functionality of the object positioning unit 110 of FIG. 1 is provided across multiple processing devices.

Whilst the example directly above may require a client device to download the environment, file sizes may still be advantageously reduced as the client device may not need to download object data (such as meshes and textures corresponding to objects positioned within a virtual environment).

Figure 3:
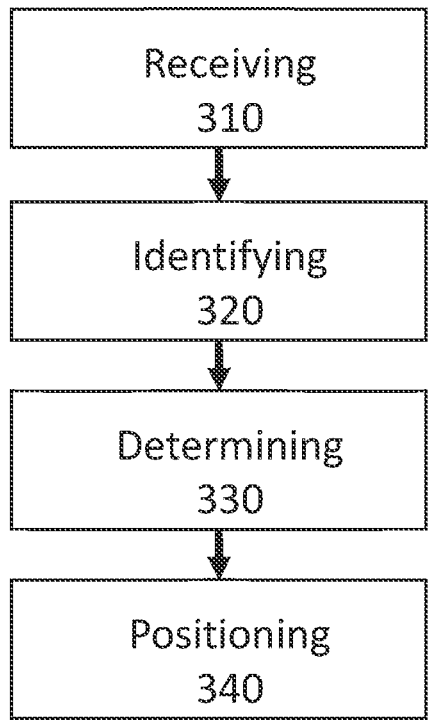
FIG. 3 schematically illustrates a flowchart of an object positioning method.

FIG. 3 illustrates a method for positioning objects within an environment provided by the present disclosure. The method comprising: receiving 310 receive data representative of at least a portion of an environment comprising one or more features associated with the environment; identifying 320, for one or more objects, one or more features associated with each respective object; determining 330 which of the one or more objects are to be positioned within the environment; and positioning 340 the one or more determined objects within the environment in dependence upon at least one of the features associated with the environment and at least one of the features associated with each respective determined object. The step of positioning utilises a machine learning model, trained using one or more examples of one or more objects positioned within at least a portion of one or more environments in dependence upon at least one feature associated with each respective environment and at least one feature associated with each respective object as an input, to position the one or more determined objects within the environment.

Asset Generation

Similarly to the above-described problems relating to the positioning of objects, there is often a significant time, and thus frequently a high cost, required to generate assets, such as objects as described elsewhere herein, which may be suitable to be used within a particular environment. Therefore, it may be desirable to provide a system and method for asset generation that advantageously enables a streamlined generation of modified object data, which is representative of one or more objects in one or more target styles. Such systems and method may be used to reduce a burden upon content creators in generating content, while simultaneously increasing the variability of content, as well as enabling content to be distributed in a more efficient manner.

Additionally, the modified object data may, for example, then be used by the object positioning system 200, which may position at least one of objects represented within the modified object data within an environment.

Figure 4:
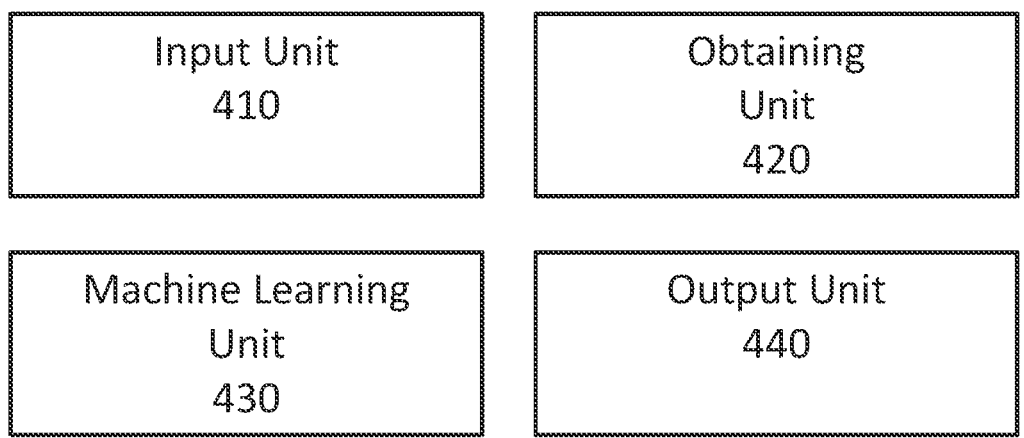
FIG. 4 schematically illustrates an example asset generation system.

FIG. 4 schematically illustrates a system of asset generation in accordance with one or more embodiments of the present disclosure. This system 400 comprises an input unit 410, an obtaining unit 420, a machine learning unit 430, and an output unit 440.

The input unit 410 is configured to receive object data representative of one or more objects. The object data may comprise any suitable information about an object, and in some cases may include the object itself in addition to, or instead of, the information about the object. Suitable information may be any information that can be used to characterise the object, including information about its appearance, shape, size, and the type of object. This object data may include explicit information relating to an object (such as a list of parameter values), and/or information (such as image or model data) that enables such information to be derived.

Inputs received by the input unit 410 may comprise one or more inputs from a user (such as the player of a game, or a developer of content). These inputs may be provided using one or more control devices (such as a gamepad or keyboard and mouse) associated with the system. In some embodiments, these inputs can also, or instead, be provided to a different device to the device that performs the asset generation process. The inputs from the user may select one or more objects that are to be represented by the object data, for example, and/or may provide one or more criteria that are used to identify one or more objects that are to be represented by the object data. Optionally, the objects to be represented in the object data may be determined using the above-described techniques relating to the object determining unit 220 determining which of the one or more objects are to be positioned within the environment.

Alternatively, or in addition, the object data may be received without a user input, such as being received from the object positioning system 200 of FIG. 2. For example, the input unit 410 may receive the object data from the object determining unit 220, where the one or more objects represented within the object data may correspond to the one or more determined objects as described elsewhere herein. This can therefore enable a process to be implemented with a reduced burden upon the user.

As another example, the input unit 410 may receive the object data from the output unit 240, where the object data may be data representative of at least part of an environment comprising one or more objects positioned by the object positioning unit 230, as described elsewhere herein. In this example, the one or more objects represented within the object data may correspond to the one or more objects positioned by the object positioning unit 230. Therefore, in some embodiments of the present disclosure, the object data may comprise data representative of at least a portion of an environment comprising at least one of the objects represented within the object data.

Alternatively, or in addition, data representative of an object may comprise one or more of: an image texture of the object, which may optionally include a texture mapping that indicates how the image texture is applied to the object; a polygon mesh of the object, or any other suitable representation of the object's shape such as set of one or more voxels; an image of the object; or any other data that may be representative of the object.

The obtaining unit 420 is operable to obtain style data representative of one or more target styles. In embodiments of the present disclosure, the target style may be considered to be information indicating a preferred visual effect for one or more objects within a virtual environment; this preferred visual effect may include particular colour palettes or object shapes, for instance. In other words, the target style may in some embodiments be considered to specify, through the use of one or more parameters or the like, preferred characteristics relating to appearance for one or more objects. In some embodiments, the obtaining unit 420 may receive the style data as an input in a manner similar to any of the above described operations of the input unit 410. Alternatively, or in addition, the obtaining unit 420 may obtain the style data directly from a storage device (not shown) or obtain the style data from a networked device (not shown).

In some embodiments, the style data may comprise image data representative of at least one of the target styles. For example, the image data may comprise an image of a painting, concept art, or a picture of an environment or virtual environment, which are all examples of image data representative of at least one target style. For instance, image processing may be performed on an image to extract characteristic information such as the range of colours in the image and the presence of particular symbols or the like. In some cases, it may be considered that the characteristic information is that information which makes a particular image distinctive when compared to other images comprising similar subject matter—for example, in two pictures of buildings the architectural style, image brightness, and colour palette may each be examples of characteristic information.

A target style may be defined using any number of parameters; for instance, a colour palette, a brightness, and/or a contrast may each be considered suitable parameters for representing a target style. Rather than being limited to image properties, the target style may also comprise image elements, such as particular symbols, and characteristics such as fonts to be used in images conforming to the style. A target style, and the aspects that characterise the target style, may be identified machine learning unit 430 which is described below.

In some embodiments, a target style may be defined by a correlation between different features within an image, where the features may be identified by a user or the machine learning unit 430, for example. A feature may be a feature that differentiates a particular portion of an image from other portions of the image according to a suitable measure. For instance, a feature can be identified in dependence upon a visual impression upon a user, impact of the feature upon the image, the uniqueness of the feature within the image. In other words, the target style may be derived from a consideration of which features best characterise an image. In some embodiments that is the most distinctive features, while in others it may be the most common features. An appropriate characterisation in this manner may be determined on a per-feature or per-image basis as appropriate.

Alternatively, or in addition, or the image data may comprise at least one image of one or more reference objects that are representative of at least one of the target styles. For example, one of the reference objects may be representative of a first target style, another reference object may be representative of a second target style, and yet another reference object may be representative of both the first and second target style.

Optionally, the obtaining unit 420 may be operable to identify the one or more reference objects within the image data. For example, the obtaining unit 420 may use an edge detection technique to locate an outline of a reference object, and an image recognition technique to identify the outlined reference object.

As another example, the obtaining unit 420 may be operable to identify the one or more reference objects within the image data in dependence upon an input that indicates which portions of the image data correspond to a respective reference object. For example, a user may draw an outline around a respective reference object within the image data as an input, and/or the image data may comprise metadata that indicates the outline of the respective reference object. A user input, and/or the metadata, may also identify the outlined respective reference object for example, or an image recognition technique may be used to identify the respective reference object.

In some embodiments, the style data may comprise data representative of at least a portion of an environment, in which the data representative of at least a portion of an environment is representative of at least one of the target styles. The data representative of an environment may be any of the type of data representative of an environments that are described elsewhere herein. For example, the style data may comprise data representative of a tropical island environment, which may be representative of one or more target styles associated with the tropical island environment (the target style including palm trees rather than oak trees and beaches instead of fields, for instance). As another example, the style data may comprise images of a gothic cathedral, which may be representative of a gothic style of architecture.

Optionally, the obtaining unit 420 may obtain the style data from the object data received by the input unit 410. In this case, the object data may comprise data representative of at least a portion of an environment comprising at least one of the objects represented within the object data, in which the portion of the environment is representative of at least one target style represented within the style data. This may be advantageous when the style of at least some of the objects within the portion of the environment is different to the one or more styles of the portion of the environment itself.

The machine learning unit 430 is trained to perform a style transfer to input object data. Additionally, the machine learning unit 430 is operable to receive the object data and the style data as inputs, and to generate a style-transferred representation of the object data.

The machine learning unit 430 may, for example, use the techniques for style transfer described by "A Neural Algorithm of Artistic Style", Leon A. Gatys et al., arXiv: 1508.06576v2 [cs.CV], which is hereby incorporated by reference in its entirety. These techniques also provide how one or more target styles may be identified, by the machine learning unit 430, from the style data input to the machine learning unit.

In some embodiments, the machine learning unit 430 may be operable to identify which of the target styles is to be transferred to a respective object representation within the object data. For example, when the machine learning unit 430 is trained, it may identify which target styles are commonly associated with a respective type of object. Alternatively, or in addition, the machine learning unit 430 may be operable to identify which of the target styles is to be transferred to a respective object representation within the object data in dependence upon either an input, and/or metadata associated with the object data and/or the style data for example.

In some embodiments of the present disclosure, at least one of the object representations within the modified object data is representative of at least one of the reference objects described above. For example, the machine learning unit 430 may generate at least one style-transferred representation of an object by using at least of the target styles represented within the style data and at least one representation of a reference object within the style data as an input.

In some embodiments, the machine learning model 430 may generate the style-transferred representation of the object data by modifying at least one of a texture and a geometry of at least one of the objects represented within the object data. For example, the machine learning model 430 may be trained to modify the style of an image texture of an object by modifying the colour of the image texture, or the colour of at least one of the pixels of the image texture in order for the image texture to represent a target style. Alternatively, or in addition, the machine learning model 430 may be trained to modify a geometry of an object, by modifying a polygon mesh or set of voxels defining at least a portion of the object's shape for example. Once modified by the machine learning model, the geometry, or shape, of the object may then be representative of one of the target styles.

The output unit 440 is operable to output the style-transferred representation of the object data as modified object data. Data representative of a style-transferred object within the modified object data may comprise one or more of: an image texture of the style-transferred object, which may optionally include a texture mapping that indicates how the image texture is applied to the style-transferred object; a polygon mesh of the style-transferred object, or any other suitable representation of the style-transferred object's shape such as set of one or more voxels; an image of the style-transferred object; or any other data that may be representative of the style-transferred object.

In some instances, the system 400 may execute a rendering process associated with a video game by, for example, rendering at least one of the style-transferred objects represented by the modified object data. The output unit 440 may output the rendered objects to a display. Alternatively, or in addition, the system 400 may generate the modified object data, which may then be outputted by the output unit 440 in a format that enables its use in another application, such as the object positioning system 200 for example.

Rather than being limited to outputting objects, or modifications for objects, it is also considered that a virtual environment (or a representation of a virtual environment, such as a map) may also (or instead) be output in dependence upon the target style information. For instance, given an input which indicates a particular style for buildings it is considered that a virtual environment corresponding to a city may be output, in which each of the elements within the city corresponds to the target style. Similarly, if an image of a tropical island or beach is used as a reference for the target style the output may comprise at least a portion of an island as a virtual environment.

Such an environment generation may be performed in dependence upon the classification of the target style (for example, a classification of 'tropical island' based upon an identification of style elements that are consistent with a tropical island). Alternatively, or in addition, there may be a random component to the map generation in which constraints based upon the target style are imposed on the generated environment (for instance, generating a random landmass with the target style imposing the constraint of 'there must be beaches' or the like). Further examples of constraints upon a virtual environment may include the presence/absence of tall buildings, a building or forest density, the type of terrain, and the type of flora/fauna. In-depth analysis could also be performed to derive further constraints based upon associations between features—for instance, if the style data or another input indicates that any sand should be black, then it could be inferred that there is a volcano in the vicinity as this is a common source of black sand.

In some embodiments, an established environment generation tool may be used in which information derived from the target style may be used to seed the generation of the environment. An example of this is that a scene from an image may be used to generate an initial portion of the environment (such as a beach), with successive portions of the environment being generated in an iterative manner (such as the sea and sand dunes that surround the beach, followed by a wooded area or town that lies the other side of the sand dunes).

The virtual environment, or map, generation process may be performed in accordance with any suitable environment/map generation process based upon constraints that are able to be derived from the target style.

The system of FIG. 4 may be implemented using any suitable combination of processing devices and/or other components. For instance, the input unit 410 may be associated with a first processing device (such as a personal computer used by a developer) while the obtaining unit 420, machine learning unit 430 and output unit 440 are implemented by a games console that is used to generate images of gameplay (comprising at least one object represented by the modified object data output from the output unit 440) for a player.

In some embodiments, one or more of the processing functions described above may be implemented using one or more server-based processing systems. This may be particularly advantageous in cloud gaming arrangements, for instance. In such cases, a server may be configured to receive inputs from a user to receive data the object data, and optionally an indication of the one or more target styles. The server may then obtain the style data from storage for example, and provide the style data and the object data as an input to the machine learning model, which generates a style-transferred representation of the object data (which is performed by the server). The server may then stream the modified object data to the user at their client device. Alternatively, each of the processing functions may be implemented by a single device and an associated display (such as a games console and television) or a single device comprising each of the elements (such as a handheld games console).

The arrangement of FIG. 4 is an example of a processor (for example, a GPU and/or CPU located in a games console or any other computing device) that is operable to generate assets, and in particular is operable to:

receive object data representative of one or more objects;
a. obtain style data representative of one or more target styles;
b. receive, at a machine learning model trained to perform a style transfer to input object data, and operable to receive the object data and the style data as inputs;
c. generate, using the machine learning model, a style-transferred representation of the object data; and
d. output the style-transferred representation of the object data as modified object data.

In some embodiments of the present disclosure, the modified object data may be for use in a video game. In these embodiments, the machine learning unit 430 may generate a style-transferred representation of the object data in response to an initialisation of the video game or a user input to the video game.

This may advantageously enable a reduction in the file size of a video game using a system 400 for generating assets in accordance with the present disclosure compared to a video game model not using the system 400 for generating assets. This is because it would only be necessary to provide the object data that may not be representative of any style, such as an untextured placeholder object, rather than the modified object data representative of one or more target styles, which may have a smaller file size. This may therefore reduce the required amount of data that needs to be downloaded from a server or provided on a disc, for example.

Furthermore, the system 400 may enable the same object data to be reused in order to generate another style-transferred representation of the object data, by using another set of style data representative of one or more other target styles as an input. At least one of the target styles may correspond to at least one of the other target styles, or may not correspond to any of the other target styles.

For example, a client device (such as a games console) comprising the system 400 (that is, a processor for implementing the functionality of the system 400) may download a video game (comprising style data representative of one or more target styles) without being required to download a style-transferred representation of object data representative of one or more objects in the one or more target styles, as the machine learning unit 430 may generate the style-transferred representation of the object data (the object data may be within the video game download, obtained through another download, and/or be previously stored within the client device for example) in response to an initialisation of the video game or a user input to the video game. The output unit 440 may then output the style-transferred representation of the object data as modified object data. Optionally, the modified object data may be used by the object positioning system 200, which may position at least one object represented within the modified object data within a virtual environment. The virtual environment may then be rendered by the client device.

Whilst the example directly above may require a client device to download the style data, and optionally the object data, file sizes may still be advantageously reduced as the client device may only need to download placeholder objects and not object data representative of the one or more target styles. For example, a placeholder object may be a polygon mesh of an object without a corresponding image texture. The image texture may then be generated by the machine learning unit 430 in a target style.

In the case in which content that has already been subjected to an asset generation process according to one or more embodiments of the disclosure is to be downloaded, it may be observed that less data is required than for a similar set of assets that have not been subjected to such a process. This is because the use of a more consistent style may reduce the amount of texture data associated with the assets, as more of the texture data may be able to be reused between objects.

Figure 5:
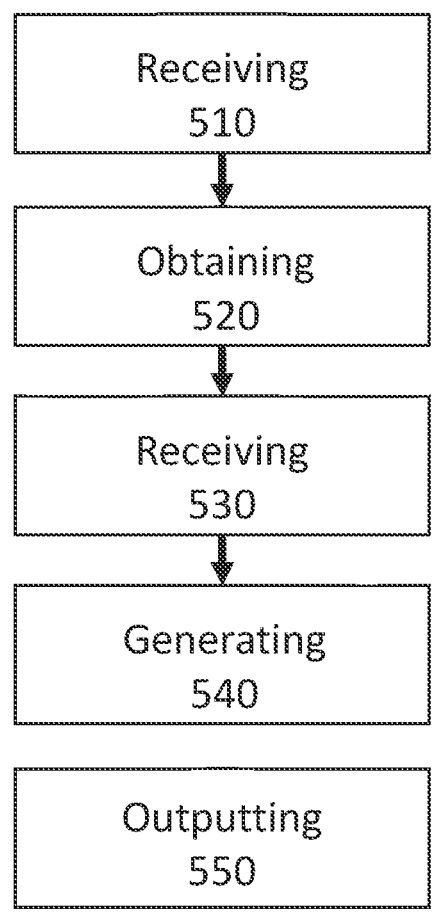
FIG. 5 schematically illustrates a flowchart of an asset generation method.

FIG. 5 illustrates a method for generating assets. The method comprising the steps of: receiving 510 object data representative of one or more objects; obtaining 520 style data representative of one or more target styles; receiving 530, at a machine learning model trained to perform a style transfer to input object data, the object data and the style data as inputs; generating 540, using the machine learning model, a style-transferred representation of the object data; and outputting 550 the style-transferred representation of the object data as modified object data.

In some embodiments of the present disclosure, a computer program is provided. The computer program comprising computer executable instructions adapted to cause a computer system to perform any of the methods described elsewhere herein.

It will be appreciated that the above methods may be carried out on conventional hardware (such as system 200 or system 400) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for positioning objects within an environment, the system comprising:
   one or more processors; and
   one or more memories storing instructions that, upon execution by the one or more processors, configure the system to:
      determine an object to be positioned within an environment by selecting the object based on a first task for a user to complete within the environment and a second task associated with the object; and
      position, by using a machine learning model, the object within the environment based on a first feature associated with the environment and a second feature associated with the object,
   wherein:
      the first feature comprises a first set of one or more tasks for the user to complete within the environment; and
      the second feature comprises a second set of tasks that require the object for completion of at least a part of the second task within the second set.

2. The system of claim 1, wherein the execution of the instructions further configures the system to determine one or more objects to be positioned, by selecting the one or more objects to be positioned in dependence upon at least one feature associated with the environment.

3. The system of claim 1, wherein the execution of the instructions further configures the system to determine one or more objects to be positioned by receiving one or more user inputs identifying at least one of the one or more objects to be positioned.

4. The system of claim 1, wherein the execution of the instructions further configures the system to position at least one of the determined objects within the environment in dependence upon one or more features associated with one or more objects already positioned within the environment.

5. The system of claim 1, wherein the execution of the instructions further configures the system to position the at least one of the determined objects within the environment in dependence upon a relationship between the at least one of the determined objects and at least one of the features associated with at least one of an already positioned objects.

6. The system of claim 1, wherein one or more features associated with an object are one or more of the features selected from a list consisting of:
   size of the object;
   orientation of the object;
   shape of the object;
   one or more categories that comprise the object;
   one or more colors of the object;
   material of the object;
   an interactivity level of the object;
   a rarity of the object; and
   a type of environment suitable for the object.

7. The system of claim 1, wherein the machine learning model is trained to identify a relationship between positions of one or more types of object and positions of one or more other types of object.

8. The system according to claim 1, wherein the system is further configured to:
   receive data representative of one or more objects already positioned within the environment; and
   identify, for one or more objects, one or more features associated with each respective object.

9. The system of claim 1, wherein the execution of the instructions further configures the system to identify, for one or more determined objects, an order in which the one or more determined objects are to be positioned within the environment in dependence upon one or more features associated with at least one of the determined objects.

10. The system of claim 1, wherein the environment is a virtual environment.

11. The system of claim 1, wherein the execution of the instructions further configures the system to output data representative of at least part of the environment comprising one or more positioned objects and operable to render an output environment.

12. A method, for positioning objects within an environment, the method comprising:
determining an object to be positioned within an environment by selecting the object based on a first task for a user to complete within the environment and a second task associated with the object; and
   positioning, by using a machine learning model, the object within the environment based on a first feature associated with the environment and a second feature associated with the object,
   wherein:
      the first feature comprises a first set of tasks for the user to complete within the environment; and
      the second feature comprises a second set of tasks that require the object for completion of at least a part of the second task within the second set.

13. The method of claim 12, further comprising determining one or more objects to be positioned, by selecting one or more objects to be positioned in dependence upon at least one of the features associated with the environment.

14. The method of claim 12, further comprising:
   determining one or more objects to be positioned by receiving one or more user inputs; and
   identifying at least one of the one or more objects to be positioned.

15. The method of claim 12, further comprising positioning at least one of the determined objects within the environment in dependence upon one or more features associated with one or more objects already positioned within the environment.

16. A non-transitory machine-readable storage medium storing computer software which, when executed by a computer, causes the computer to carry out a method, for positioning objects within an environment, the method comprising:
determining an object to be positioned within the environment by selecting the object based on a first task for a user to complete within the environment and a second task associated with the object; and
   positioning, by using a machine learning model, the object within the environment based on a first feature associated with the environment and a second feature associated with the, object,
wherein:
the first feature comprises a first set of tasks for the user to complete within the environment; and
the second feature comprises a second set of tasks that require the object for completion of at least a part of the second task within the second set.

17. The non-transitory machine-readable storage medium of claim 16, wherein the machine learning model is trained to identify a relationship between positions of one or more types of object and positions of one or more other types of object.

18. The non-transitory machine-readable storage medium of claim 16, wherein one or more features associated with an object are one or more of the features selected from a list consisting of:
   size of the object;
   orientation of the object;
   shape of the object;
   one or more categories that comprise the object;
   one or more colors of the object;
   material of the object;
   an interactivity level of the object;
   a rarity of the object; and
   a type of environment suitable for the object.

* * * * *